(12) United States Patent
Kunzler et al.

(10) Patent No.: US 7,423,108 B2
(45) Date of Patent: Sep. 9, 2008

(54) HIGH REFRACTIVE-INDEX SILOXY-CONTAINING MONOMERS AND POLYMERS, AND OPHTHALMIC DEVICES COMPRISING SUCH POLYMERS

(75) Inventors: Jay F. Kunzler, Canandaigua, NY (US); Joseph C. Salamone, Boca Raton, FL (US); Richard M. Ozark, Solvay, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 462 days.

(21) Appl. No.: 11/305,606

(22) Filed: Dec. 16, 2005

(65) Prior Publication Data

US 2007/0142551 A1  Jun. 21, 2007

(51) Int. Cl.
*C08G 77/12* (2006.01)
(52) U.S. Cl. .................. 528/31; 528/32; 523/105; 523/107
(58) Field of Classification Search ........... 528/32, 528/31; 523/107, 105
See application file for complete search history.

(56) References Cited

U.S. PATENT DOCUMENTS

| | | | |
|---|---|---|---|
| 3,018,270 A | 1/1962 | Toogood | |
| 3,249,581 A | 5/1966 | Nelson et al. | |
| 3,996,189 A | 12/1976 | Travnicek | |
| 4,327,203 A | 4/1982 | Deichert et al. | |
| 4,355,147 A | 10/1982 | Deichert et al. | |
| 4,780,510 A | 10/1988 | Uemiya et al. | |
| 5,147,396 A | 9/1992 | Kageyama et al. | |
| 5,233,007 A | 8/1993 | Yang | |
| 5,270,418 A | 12/1993 | Kunzler et al. | |
| 5,300,607 A | 4/1994 | Nakanishi et al. | |
| 5,420,213 A | 5/1995 | Yang | |
| 5,610,252 A | 3/1997 | Bambury et al. | |
| 6,329,485 B1 | 12/2001 | Vanderbilt | |
| 6,657,030 B2 | 12/2003 | Vanderbilt | |
| 6,730,767 B2 | 5/2004 | Salamone et al. | |
| 6,852,793 B2 | 2/2005 | Salamone et al. | |
| 6,864,341 B2 | 3/2005 | Lai et al. | |
| 6,908,978 B2 | 6/2005 | Salamone et al. | |
| 6,956,087 B2 | 10/2005 | Lai et al. | |
| 2003/0162929 A1 | 8/2003 | Verbruggen et al. | |

FOREIGN PATENT DOCUMENTS

JP   2005-336327   * 12/2005
WO   WO 93/21258 A1   10/1993

OTHER PUBLICATIONS

International Search Report (PCT/ISA/210) and Written Opinion (PCT/ISA/237) mailed on Aug. 8, 2007.

* cited by examiner

*Primary Examiner*—Kuo-Liang Peng
(74) *Attorney, Agent, or Firm*—Joseph Barrera

(57) ABSTRACT

Siloxy-containing monomers, macromonomers, or polymers have at least a siloxy-containing side group that comprises a refractive-index increasing substituent. Polymeric compositions comprising such siloxy-containing monomers, macromonomers, or polymers are advantageously used for making ophthalmic devices, such as intraocular lenses, contact lenses, corneal rings, corneal inlays, and keratoprostheses.

5 Claims, No Drawings

HIGH REFRACTIVE-INDEX SILOXY-CONTAINING MONOMERS AND POLYMERS, AND OPHTHALMIC DEVICES COMPRISING SUCH POLYMERS

BACKGROUND OF THE INVENTION

The present invention relates to high refractive-index siloxy-containing monomers, macromonomers, and polymers, and ophthalmic devices comprising such polymers. In particular, the present invention relates to such monomers, macromonomers, and polymers having arylsiloxy-containing side groups.

Since the 1940s ophthalmic devices in the form of intraocular lens ("IOL") implants have been utilized as replacements for diseased or damaged natural ocular lenses. In most cases, an intraocular lens is implanted within an eye at the time of surgically removing the diseased or damaged natural lens, such as for example, in the case of cataracts. For decades, the preferred material for fabricating such intraocular lens implants was poly(methyl methacrylate), which is a rigid, glassy polymer.

Softer, more flexible IOL implants have gained in popularity in more recent years due to their ability to be compressed, folded, rolled or otherwise deformed. Such softer IOL implants may be deformed prior to insertion thereof through an incision in the cornea of an eye. Following insertion of the IOL in an eye, the IOL returns to its original pre-deformed shape due to the memory characteristics of the soft material. Softer, more flexible IOL implants as just described may be implanted into an eye through an incision that is much smaller, i.e., less than 4 mm, than that necessary for more rigid IOLs, i.e., 5.5 to 7 mm. A larger incision is necessary for more rigid IOL implants because the lens must be inserted through an incision in the cornea slightly larger than the diameter of the inflexible IOL optic portion. Accordingly, more rigid IOL implants have become less popular in the market since larger incisions have been found to be associated with an increased incidence of postoperative complications, such as induced astigmatism.

With recent advances in small-incision cataract surgery, increased emphasis has been placed on developing soft, foldable materials suitable for use in artificial IOL implants. In general, the materials of current commercial IOLs fall into one of three general categories: silicones, hydrophilic acrylics and hydrophobic acrylics.

In general, high water content hydrophilic acrylics, or "hydrogels," have relatively low refractive indices, making them less desirable than other materials with respect to minimal incision size. Low refractive-index materials require a thicker IOL optic portion to achieve a given refractive power. Silicone materials may have a higher refractive index than high-water content hydrogels. However, it still has been a challenge to produce silicone materials having high refractive index. Low glass-transition-temperature hydrophobic acrylic materials are desirable because they typically have a high refractive index and unfold more slowly and more controllably than silicone materials. Unfortunately, low glass-transition-temperature hydrophobic acrylic materials, which contain little or no water initially, tend to absorb water over time and form pockets of water or vacuoles in vivo, causing light reflections or "glistenings." Furthermore, it may be difficult to achieve ideal folding and unfolding characteristics due to the temperature sensitivity of some acrylic polymers.

Because of the noted shortcomings of current polymeric materials available for use in the manufacture of ophthalmic implants, there is a need for stable, biocompatible polymeric materials having desirable physical characteristics and refractive indices.

SUMMARY OF THE INVENTION

In general, the present invention provides siloxy-containing monomers, macromonomers, and polymers having high refractive indices and polymeric compositions comprising such monomers or macromonomers.

In one aspect, a monomer, a macromonomer, or a polymer of the present invention has at least a side group that provides an increase in refractive index of the material compared to the polymer without such a side group.

In another aspect, said at least a side group comprises a substituted or unsubstituted aryl group.

In another aspect, said at least a side group comprises siloxy-containing units having a substituted or unsubstituted aryl group.

In still another aspect, such a siloxy-containing side group is attached to a silicon atom of the back bone chain through a divalent linking group.

In a further aspect, the present invention provides a siloxy-containing monomer, macromonomer, or polymer having a formula of

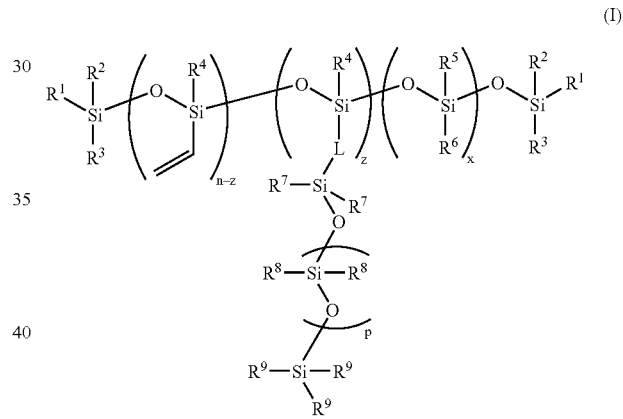

wherein $R^1$ is selected from the group consisting of unsubstituted and substituted linear $C_1$-$C_{10}$ alkyl groups, unsubstituted and substituted branched $C_3$-$C_{10}$ alkyl groups, unsubstituted and substituted cyclic $C_3$-$C_{10}$ alkyl groups, unsubstituted and substituted $C_6$-$C_{24}$ aryl groups, and vinyl group; $R^2$, $R^3$, $R^4$, $R^5$, $R^6$, $R^7$, $R^8$, and $R^9$ are independently selected from the group consisting of unsubstituted and substituted linear $C_1$-$C_{10}$ alkyl groups, unsubstituted and substituted branched $C_3$-$C_{10}$ alkyl groups, unsubstituted and substituted cyclic $C_3$-$C_{10}$ alkyl groups, and unsubstituted and substituted $C_6$-$C_{24}$ aryl groups; L is a divalent linking group; n, x, and z are positive integers; p is zero or a positive integer; and $n-z \geq 0$; provided that at least one of the $R^4$, $R^5$, $R^6$, $R^7$, $R^8$, and $R^9$ is selected from the group consisting of unsubstituted and substituted $C_6$-$C_{24}$ aryl groups.

In still another aspect, a polymeric composition comprises a homopolymer of a monomer, macromonomer, or a polymer represented by Formula I, or a copolymer of at least a hydrophilic monomer or macromonomer and a monomer, macromonomer, or a polymer represented by Formula I.

In still another aspect, the present invention provides a method of making a high refractive-index siloxy-containing monomer, macromonomer, or polymer. The method comprises: (a) providing a monomer, macromonomer, or polymer having a plurality of vinyl side groups; (b) providing a siloxy-containing compound having at least a refractive-index increasing side group and a hydride functional group; and (c) effecting a hydrosilylation reaction between the monomer, macromonomer, or polymer and the siloxy-containing compound.

In a further aspect, the refractive-index increasing side group is selected such that the resulting high refractive-index siloxy-containing monomer, macromonomer, or polymer has a refractive index greater than about 1.4, preferably greater than 1.43.

In yet another aspect, the present invention provides a method of making a hydrophilic polymeric composition having a high refractive index. The method comprises polymerizing a hydrophilic monomer or macromonomer and a monomer or macromonomer having Formula I, wherein at least one of the $R^4$, $R^5$, $R^6$, $R^7$, $R^8$, and $R^9$ groups is selected such that the refractive index of the resulting hydrophilic polymeric composition is greater than about 1.4, preferably from about 1.4 to about 1.6. In one embodiment, the refractive index is from about 1.45 to about 1.58. Such a refractive index is measured when the polymeric composition has water content less than 5 percent of the total weight.

In yet another aspect, an ophthalmic device comprises a polymeric material that is produced by polymerization of a monomer, macromonomer, or polymer represented by Formula I.

Other features and advantages of the present invention will become apparent from the following detailed description and claims.

DETAILED DESCRIPTION OF THE INVENTION

As used herein, the term "alkyl," when used generally, means linear, branched, or cyclic alkyl. The term "substituted alkyl group" means an alkyl group substituted with one or more substituents that comprise elements other than carbon and hydrogen, such as oxygen, nitrogen, sulfur, halogen (Cl, Br, I, F), or phosphorus and may comprise alkoxy, hydroxy, amino, nitro, or cyano groups.

The term "aryl group" means a radical comprising an aromatic (monocyclic or polycyclic) or hetero-aromatic (monocyclic or polycyclic) ring system obtained by removal of a hydrogen atom from a ring carbon atom, e.g., phenyl, naphthyl, anthryl, phenanthryl, furyl, pyranyl, or pyridyl radical. The term "substituted aryl group" means an aryl group that carries one or more substituents that comprise elements other than carbon and hydrogen, such as oxygen, nitrogen, sulfur, halogen (Cl, Br, I, F), or phosphorus and may comprise $C_1$-$C_{10}$ alkyl, $C_1$-$C_{10}$ alkoxy, hydroxy, amino, nitro, or cyano group. It is to be noted that fused and connected rings are included. In the context of the present invention, aryl groups will be understood to include the aryne group.

The term "high refractive index" means a refractive index of at least about 1.4 measured when the material has water content less than about 5 percent of the total weight.

In general, the present invention provides siloxy-containing monomers, macromonomers, and polymers having high refractive indices and polymeric compositions comprising such monomers or macromonomers.

In one aspect, a monomer, a macromonomer, or a polymer of the present invention has at least a side group that provides an increase in refractive index of the material compared to the polymer without such side group.

In a further aspect, the present invention provides a siloxy-containing monomer, macromonomer, or polymer having a formula of

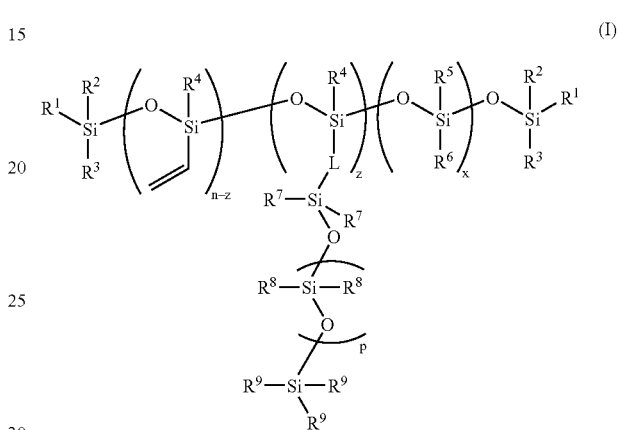

(I)

wherein $R^1$ is selected from the group consisting of unsubstituted and substituted linear $C_1$-$C_{10}$ alkyl groups, unsubstituted and substituted branched $C_3$-$C_{10}$ alkyl groups, unsubstituted and substituted cyclic $C_3$-$C_{10}$ alkyl groups, unsubstituted and substituted $C_6$-$C_{24}$ aryl groups, and vinyl group; $R^2$, $R^3$, $R^4$, $R^5$, $R^6$, $R^7$, $R^8$, and $R^9$ are independently selected from the group consisting of unsubstituted and substituted linear $C_1$-$C_{10}$ alkyl groups, unsubstituted and substituted branched $C_3$-$C_{10}$ alkyl groups, unsubstituted and substituted cyclic $C_3$-$C_{10}$ alkyl groups, and unsubstituted and substituted $C_6$-$C_{24}$ aryl groups; L is a divalent linking group; n, x, and z are positive integers; p is zero or a positive integer; and n−z≧0; provided that at least one of the $R^4$, $R^5$, $R^6$, $R^7$, $R^8$, and $R^9$ groups is selected from the group consisting of unsubstituted and substituted $C_6$-$C_{24}$ aryl groups.

Non-limiting examples of aryl groups are phenyl, biphenyl, cumenyl, mesityl, tolyl, xylyl, benzyl, vinylbenzyl, benzhydryl, cinnamyl, phenethyl, styryl, trityl, naphthyl, anthryl, phenanthryl, chrysyl, and derivatives thereof.

In one embodiment, n, x, and z is each in the range from 1 to 500, inclusive, provided that n−z≧0. In another embodiment, n, x, and z is each in the range from 1 to 200, inclusive, provided that n−z≧0. In still another embodiment, n, x, and z is each in the range from 1 to 100, inclusive, provided that n−z≧0.

In one aspect, the monomer, macromonomer, or polymer has at least one polymerizable functional group. In another aspect, n−z>0 when neither $R^1$ group is vinyl.

In another aspect, n−z>0. In still another aspect, 0<(n−z)/n<0.2, or 0<(n−z)/n<0.1, or 0<(n−z)/n<0.05.

In one embodiment, 0≦p≦20 (or 0≦p≦10, or 0≦p≦5).

In another embodiment, $R^1$ is selected from the group consisting of methyl, ethyl, and propyl. In another embodiment, $R^1$ is the methyl group. In still another embodiment, at least one $R^1$ group is the vinyl group.

In one aspect, $R^2$ and $R^3$ are independently selected from the group consisting of methyl, ethyl, and propyl. In another aspect, $R^2$ and $R^3$ are the methyl group.

In another aspect, $R^4$ and $R^7$ are independently selected from the group consisting of methyl, ethyl, and propyl. In still another aspect, $R^4$ and $R^7$ are the methyl group.

In a further aspect, at least one of $R^5$ and $R^6$ is an unsubstituted or substituted $C_6$-$C_{24}$ aryl group. In still a further aspect, at least one of $R^5$ and $R^6$ is the phenyl group.

In a still further aspect, $R^9$ is an unsubstituted or substituted $C_6$-$C_{24}$ aryl group. In yet another aspect, $R^9$ is the phenyl group.

In a still further aspect, at least one of $R^8$ and $R^9$ is a substituted phenyl group. In yet another aspect, at least one of $R^8$ and $R^9$ is an aryl group other than phenyl or substituted phenyl. For example, in one embodiment, at least one of $R^8$ and $R^9$ is the naphthyl group.

In one embodiment, the present invention provides a siloxy-containing monomer, macromonomer, or polymer having Formula I; wherein $R^1$ is the vinyl group; each of the $R^2$, $R^3$, $R^4$, $R^5$, $R^6$, and $R^7$ groups is the methyl group; and each of the $R^8$ and $R^9$ groups is an unsubstituted or substituted $C_6$-$C_{24}$ aryl group.

In another embodiment, the present invention provides a siloxy-containing monomer, macromonomer, or polymer having Formula I; wherein $R^1$ is the vinyl group; each of the $R^2$, $R^3$, $R^4$, $R^5$, $R^6$, and $R^7$ groups is the methyl group; and each of the $R^8$ and $R^9$ groups is the phenyl group.

In yet another aspect, L is an ethanediyl group.

In still another aspect, a polymeric composition comprises a homopolymer of a monomer, macromonomer, or a polymer represented by Formula I, or a copolymer of at least a hydrophilic monomer or macromonomer and a monomer, macromonomer, or a polymer represented by Formula I, wherein the $R^1$, $R^2$, $R^3$, $R^4$, $R^5$, $R^6$, $R^7$, $R^8$, and $R^9$ are variously defined above. In this aspect, $R^1$ is preferably the vinyl group.

In one aspect, a polymeric composition comprising a monomer, macromonomer, or a polymer having Formula I has a refractive index greater than about 1.4, or greater than about 1.43.

In another aspect, a polymeric composition comprising a monomer, macromonomer, or a polymer having Formula I has a refractive index in the range from about 1.4 to about 1.6. In another aspect, the refractive index is in the range from about 1.45 to about 1.58. The refractive index of a material is measured when its water content is less than about 5 percent of the total weight.

In one aspect, a polymeric composition of the present invention has an equilibrium water content of greater than about 4.5 percent (by weight), thus avoiding problems related to the formation of water vacuoles. In addition, a polymeric composition of the present invention can have a relatively high elongation, such as about 80 percent or greater. Accordingly, in many aspects, the subject polymeric compositions are more suitable for use in the manufacture of ophthalmic devices than many prior-art polymeric materials.

Non-limiting examples of other hydrophilic monomers useful for polymerization with one or more siloxy-containing monomers or macromonomers of the present invention include N-vinylpyrrolidone, 2-hydroxyethyl methacrylate, N,N-dimethylacrylamide, methacrylic acid, poly(ethylene glycol monomethcarylate), 1,4-butanediol monovinyl ether, 2-aminoethyl vinyl ether, di(ethylene glycol) monovinyl ether, ethylene glycol butyl vinyl ether, ethylene glycol monovinyl ether, glycidyl vinyl ether, glyceryl vinyl ether, vinyl carbonate, and vinyl carbamate. Hydrophilic vinyl carbonate and vinyl carbamate are taught in U.S. Pat. No. 5,610,252, which is incorporated herein by reference in its entirety.

The mole fractions of the hydrophilic monomer or macromonomer and the siloxy-containing monomer or macromonomer of the present invention can be adjusted to achieve desired equilibrium water content.

Current commercial hydrophobic acrylic-based ophthalmic products have water contents less than 4.5 percent by weight. These hydrophobic products tend to absorb water over time in vivo and form water vacuoles or "glistenings." In contrast, a polymeric composition comprising units of hydrophilic monomers or macromonomers and a siloxy-containing monomer or macromonomer of the present invention should absorb water rapidly to equilibrium level. Although applicants do not wish to be bound to any particular theory, it is believed that the absorbed water also is distributed throughout the polymeric composition because of its association with the hydrophilic units. Therefore, polymeric compositions of the present invention should not present the risk of formation of water vacuoles in vivo.

Under certain circumstances, it may be desired to include a hydrophobic monomer in the polymer composition, e.g., in a minor amount, such as less than about 20 mole percent, or less than about 10 mole percent, or less than about 5 mole percent.

Non-limiting examples of hydrophobic monomers useful for including in a polymeric composition of the present invention include $C_1$-$C_{10}$ alkyl methacrylates (e.g., methyl methacrylate, ethyl methacrylate, propyl methacrylate, butyl methacrylate, octyl methacrylate, or 2-ethylhexyl methacrylate; preferably, methyl methacrylate to control mechanical properties), $C_1$-$C_{10}$ alkyl acrylates (e.g., methyl acrylate, ethyl acrylate, propyl acrylate, or hexyl acrylate; preferably, butyl acrylate to control mechanical properties), $C_6$-$C_{40}$ arylalkyl acrylates (e.g., 2-phenylethyl acrylate, benzyl acrylate, 3-phenylpropyl acrylate, 4-phenylbutyl acrylate, 5-phenylpentyl acrylate, 8-phenyloctyl acrylate, or 2-phenylethoxy acrylate; preferably, 2-phenylethyl acrylate to increase refractive index), and $C_6$-$C_{40}$ arylalkyl methacrylates (e.g., 2-phenylethyl methacrylate, 3-phenylpropyl methacrylate, 4-phenylbutyl methacrylate, 5-phenylpentyl methacrylate, 8-phenyloctyl methacrylate, 2-phenoxyethyl methacrylate, 3,3-diphenylpropyl methacrylate, 2-(1-naphthylethyl) methacrylate, benzyl methacrylate, or 2-(2-naphthylethyl) methacrylate; preferably, 2-phenylethyl methacrylate to increase refractive index). Other suitable hydrophobic monomers include silicon-containing monomers, especially aromatic-based silicon-containing monomer, such as 3-methacryloyloxypropyldiphenylmethylsilane.

A monomer, macromonomer, or a polymer of Formula I can be produced by a method illustrated in Scheme 1.

Scheme 1
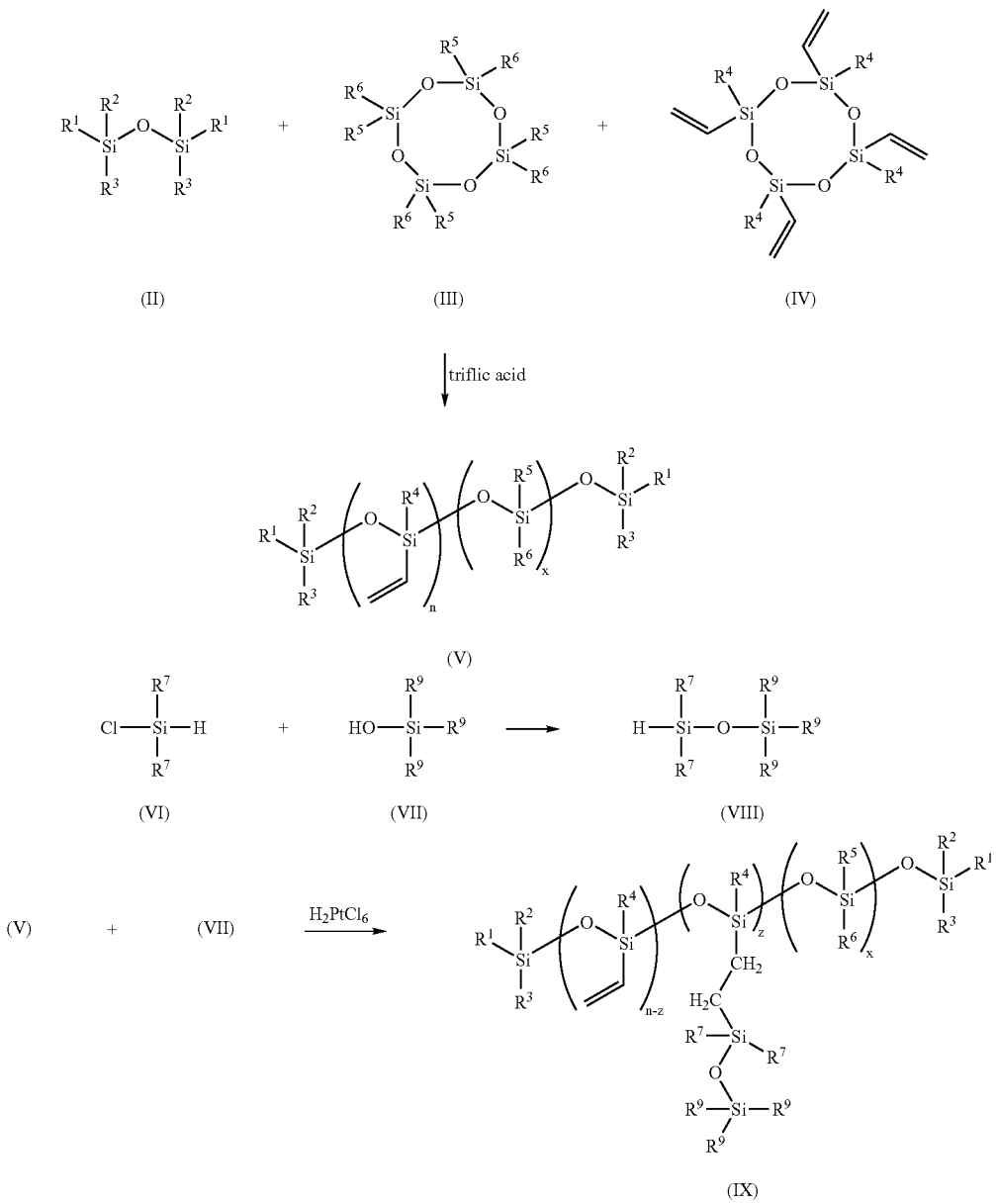
Alternatively, the synthesis is illustrated in Scheme 2.
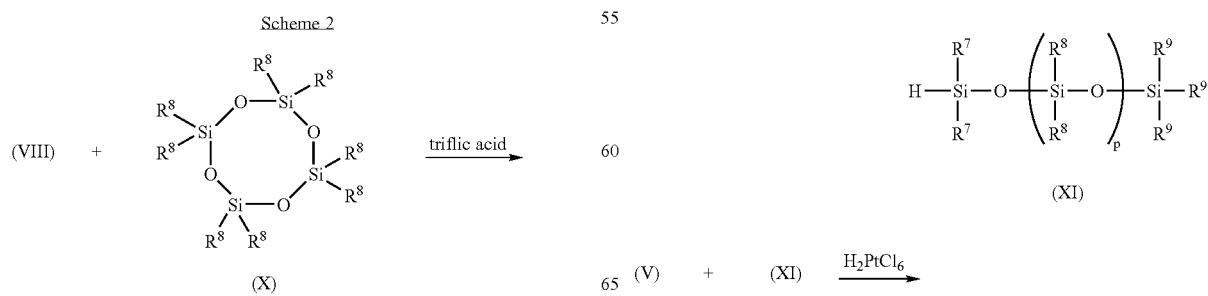

-continued

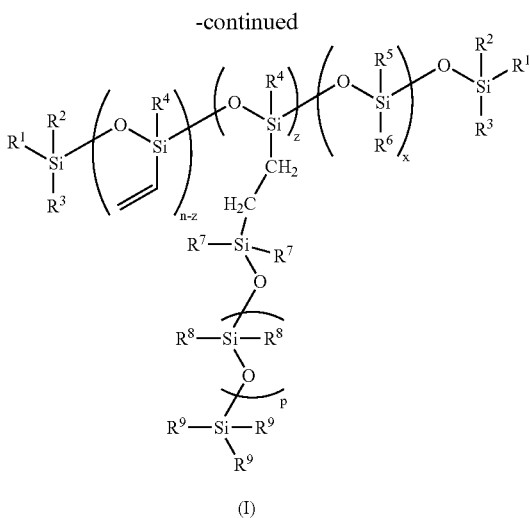

(I)

wherein $R^1$, $R^2$, $R^3$, $R^4$, $R^5$, $R^6$, $R^7$, $R^8$, and $R^9$, and n, p, x, z are defined above.

A formulation for the production of a polymer composition comprising a siloxy-containing monomer, macromonomer, or polymer of the present invention can include one or more crosslinking agents in an amount less than about 10 percent by weight of the weight of the formulation, excluding solvent, if desired. In one embodiment, the crosslinking agents are present in an amount less than about 5 percent by weight. In another embodiment, the crosslinking agents are present in an amount less than about 2 percent by weight.

Non-limiting examples of suitable crosslinking agents include ethylene glycol dimethacrylate ("EGDMA"); diethylene glycol dimethacrylate; ethylene glycol diacrylate; triethylene glycol dimethacrylate; triethylene diacrylate; allyl methacrylates; allyl acrylates; 1,3-propanediol dimethacrylate; 1,3-propanediol diacrylate; 1,6-hexanediol dimethacrylate; 1,6-hexanediol diacrylate; 1,4-butanediol dimethacrylate; N,N'-methylene-bis(meth)acrylamide; 1,4-butanediol diacrylate; trimethylolpropane trimethacrylate ("TMPTMA"); glycerol trimethacrylate; poly(ethylene oxide) diacrylate; N,N'-dihydroxyethylene bisacrylamide; diallyl phthalate; triallyl cyanurate; divinylbenzene; ethylene glycol divinyl ether; divinylsulfone; 1,4-butanediol divinyl ether; 1,6-hexanediol divinyl ether; allyl ether; tetraethylene glycol diallyl ether; trimethylolpropane diallyl ether; 1,3-bis (3-methacryloyloxypropyl)-1,1,3,3-tetramethyldisiloxane, 1,3-bis(3-methacryloyloxypropyl)-1,1,3,3-(trimethylsiloxy) disiloxane, and the like. Preferably, the crosslinking agents are selected from the group consisting of ethylene glycol divinyl ether; divinylsulfone; 1,4-butanediol divinyl ether; 1,6-hexanediol divinyl ether; diallyl ether; tetraethylene glycol diallyl ether; and trimethylolpropane diallyl ether.

In one aspect, the present invention provides a method for producing a high refractive-index siloxy-containing monomer, macromonomer, or polymer. The method comprises: (a) providing a monomer, macromonomer, or polymer having a plurality of vinyl side groups; (b) providing a siloxy-containing compound having at least a refractive-index increasing side group and a hydride functional group; and (c) effecting a hydrosilylation reaction between the monomer, macromonomer, or polymer and the siloxy-containing compound. In one embodiment, the monomer, macromonomer, or polymer having a plurality of vinyl side groups comprises a siloxy-containing back bone chain.

In another aspect, the present invention provides a method of making a hydrophilic polymeric composition having a high refractive index. The method comprises polymerizing a hydrophilic monomer or macromonomer and a monomer or macromonomer having Formula I, wherein $R^1$, $R^2$, $R^3$, $R^4$, $R^5$, $R^6$, $R^7$, $R^8$, and $R^9$ are defined above, and at least one of the $R^4$, $R^5$, $R^6$, $R^7$, $R^8$, and $R^9$ groups is selected such that the refractive index of the resulting hydrophilic polymeric composition is greater than about 1.4, preferably from about 1.4 to about 1.6. In one embodiment, the refractive index is from about 1.45 to about 1.58.

Homopolymers of a siloxy-containing monomer or macromonomer of the present invention and copolymers comprising one or more such siloxy-containing monomers or macromonomers of the present invention and at least another monomer can be produced by free radical polymerization. For example, the polymerization can be carried out in the presence of a thermal polymerization initiator (such as one selected from the list of thermal polymerization initiators disclosed below) at a temperature in the range from about 20° C. to about 120° C. Alternatively, the polymerization can be carried out in the presence of a photoinitiator selected from the list of photoinitiators disclosed below at a temperature in the range from about 20° C. to about 60° C. A desired molar ratio of the siloxy-containing monomer or macromonomer and said at least another monomer can be chosen and a desired molecular weight can be achieved by a skilled artisan. For example, the number of repeating units of each type of monomer can be in the range from about 1 to about 100,000, or from 1 to about 50,000, or from 1 to about 20,000, or from 1 to about 5,000.

Although not required, homopolymers or copolymers within the scope of the present invention may optionally have one or more strengthening agents added prior to polymerization, preferably in quantities of less than about 80 weight percent but more typically from about 20 to about 60 weight percent. Non-limiting examples of suitable strengthening agents are described in U.S. Pat. Nos. 4,327,203; 4,355,147; and 5,270,418; each of which is incorporated herein in its entirety by reference. Specific examples, not intended to be limiting, of such strengthening agents include cycloalkyl acrylates and methacrylates; e.g., tert-butylcyclohexyl methacrylate and isopropylcyclopentyl acrylate.

One or more ultraviolet ("UV") light absorbers may optionally be added to the copolymers prior to polymerization in quantities less than about 5 percent by weight. Suitable UV light absorbers for use in the present invention include for example, but are not limited to, β-(4-benzotriazoyl-3-hydroxyphenoxy)ethyl acrylate; 4-(2-acryloxyethoxy)-2-hydroxybenzophenone; 4-methacryloyloxy-2-hydroxybenzophenone; 2-(2'-methacryloyloxy-5'-methylphenyl) benzotriazole; 2-(2'-hydroxy-5'-methacryloyloxyethylphenyl)-2H-benzotriazole; 2-[3'-tert-butyl-2'-hydroxy-5'-(3"-methacryloyloxypropyl)phenyl]-5-chlorobenzotriazole; 2-(3'-tert-butyl-5'-(3"-dimethylvinylsilylpropoxy)-2'-hydroxyphenyl]-5-methoxybenzotriazole; 2-(3'-allyl-2'-hydroxy-5'-methylphenyl)benzotriazole; 2-[3'-tert-butyl-2'-hydroxy-5'-(3"-methacryloyloxypropoxy)phenyl]-5-methoxybenzotriazole, and 2-[3'-tert-butyl-2'-hydroxy-5'-(3"-methacryloyloxypropoxy)phenyl]-5- chlorobenzotriazole. Preferably, the UV light absorber also has a polymerizable functional group. In one embodiment, the preferred UV light absorbers are β-(4-benzotriazoyl-3-hydroxyphenoxy)ethyl acrylate and 2-[3'-tert-butyl-2'-hydroxy-5'-(3"-methacryloyloxypropoxy)phenyl]-5-chlorobenzotriazole.

One or more suitable free radical polymerization initiators may be desirably added to the copolymers of the present invention. These initiators include thermal polymerization initiators and photopolymerization initiators. Thermal polymerization initiators include organic peroxy compounds and azobis(organonitrile) compounds. Non-limiting examples of suitable organic peroxy compounds include peroxymonocarbonate esters, such as tert-butylperoxy isopropyl carbonate; peroxydicarbonate esters, such as di(2-ethylhexyl) peroxydicarbonate, di(sec-butyl) peroxydicarbonate, and diisopropyl peroxydicarbonate; diacyl peroxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters, such as tert-butylperoxy pivalate, tert-butylperoxy octylate, and tert-butylperoxy isobutyrate; methylethylketone peroxide; and acetylcyclohexane sulfonyl peroxide. Non-limiting examples of suitable azobis(organonitrile) compounds include azobis(isobutyronitrile); 2,2'-azobis(2,4-dimethylpentanenitrile); 1,1'-azobiscyclohexanecarbonitrile; and azobis(2,4-dimethylvaleronitrile); and mixtures thereof. Preferably, such an initiator is employed in a concentration of approximately 0.01 to 1 percent by weight of the total monomer mixture.

Representative UV photopolymerization initiators include those known in the field, such as the classes of benzophenone and its derivatives, benzoin ethers, and phosphine oxides. Some non-limiting examples of these initiators are benzophenone; 4,4'-bis(dimethylamino)benzophenone; 4,4'-dihydroxybenzophenone; 2,2-diethoxyacetophenone; 2,2-dimethoxy-2-phenylacetophenone; 4-(dimethylamino) benzophenone; 2,5-dimethylbenzophenone; 3,4-dimethybenzophenone; 4'-ethoxyacetophenone; 3'-hydroxyacetophenone; 4'-hydroxyacetophenone; 3-hydroxybenzophenone; 4-hydroxybenzophenone; 1-hydroxycyclohexyl phenyl ketone; 2-hydroxy-2-methylpropiophenone; 2-methylbenzophenone; 3-methylbenzophenone; 4'-phenoxyacetophenone; 2-methyl-4'-(methylthio)-2-morpholinopropiophenone; benzoin methyl ether; benzoin ethyl ether; diphenyl(2,4,6-trimethylbenzoyl)phosphine oxide. These initiators are commercially available from Sigma-Aldrich. Other photo polymerization initiators are known under the trade names Darocur™ and Irgacure™, such as Darocur™ 1173 (2-hydroxy-2-methyl-1-phenyl-1-propanone), Irgacure™ 651 (2,2-dimethoxy-2-phenylacetophenone), Irgacure™ 819 (phenyl-bis(2,4,6-trimethyl benzoyl) phosphine oxide), and Irgacure™ 184 (1-hydroxy cyclohexyl phenyl ketone) from Ciba-Geigy, Basel, Switzerland.

EXAMPLE 1

Preparation of Divinyl-Terminated Poly(dimethylsiloxane-co-methylvinylsiloxane)

A three-neck, 500 ml round bottom flask connected with a reflux condenser and nitrogen purge inlet tube is charged with 1,1,3,3,5,5,7,7-octamethylcyclotetrasiloxane; 1,3,5,7-tetramethyl-1,3,5,7-tetravinylcyclotetrasiloxane; 1,3-divinyltetramethyldisiloxane; and a small amount of aminosilanoate as catalyst (from Gelest, Inc., Morrisville, Pa.). The relative amounts of 1,1,3,3,5,5,7,7-octamethyltetrasiloxane and 1,3,5,7-tetramethyl-1,3,5,7-tetravinylsiloxane are chosen to achieve the desired ratio of the dimethylsiloxy units to the methylvinylsiloxy units. The contents are stirred under nitrogen and heated with an oil bath at 80-90° C. After 16 hours, the contents are heated to 140° C. to decompose the aminosilanoate catalyst to yield the divinyl-terminated poly (dimethylsiloxane-co-methylvinylsiloxane).

EXAMPLE 2

Preparation of 1,1-dimethyl-3,3,3-triphenyldisiloxane

A three-neck, 500 ml round bottom flask connected with a reflux condenser and nitrogen purge inlet tube is charged under nitrogen purge with equal molar amounts of dimethylchlorosilane and triphenylsilanol (from Gelest, Inc., Morrisville, Pa.). The contents are stirred under nitrogen and heated with an oil bath at 80-90° C. for 2 hours to produce 1,1-dimethyl-3,3,3-triphenyldisiloxane.

EXAMPLE 3

Preparation of Divinyl-Terminated Poly(dimethylsiloxane-co-methylvinylsiloxane) Under an Alternate Reaction Condition as Compared to Example 1

A three-neck, 500 ml round bottom flask connected with a reflux condenser and nitrogen purge inlet tube is charged with 1,1,3,3,5,5,7,7-octamethylcyclotetrasiloxane; 1,3,5,7-tetramethyl-1,3,5,7-tetravinylcyclotetrasiloxane; 1,3-divinyltetramethyldisiloxane; and a small amount of triflic acid (less than about 0.5 weight percent, preferably less than about 0.25 weight percent). The contents are stirred under nitrogen for 16 hours. To contents is then added an amount of about 200 ml of ether. The contents are then washed with 100 ml of 0.05 N of sodium hydroxide and then with 100 ml of water to bring the pH to 7. The contents are then dried with magnesium sulfate and filtered. The ether solution is vacuum stripped at room temperature to give the product of divinyl-terminated poly(dimethylsiloxane-co-methylvinylsiloxane).

EXAMPLE 4

Preparation of Polysiloxane Having Formula IX

A three-neck, 500 ml round bottom flask connected with a reflux condenser and nitrogen purge inlet tube is charged with divinyl-terminated poly(dimethylsiloxane-co-methylvinylsiloxane) of Example 1 or 3; 1,1-dimethyl-3,3,3-triphenyldisiloxane; a small amount chloroplatinic acid catalyst (e.g., less than about 0.1 weight percent); and an amount of xylene solvent (other inert non-polar organic solvents may also be used) enough to facilitate the reaction, but not excessive so as to burden the final purification step. The relative amounts of poly(dimethylsiloxane-co-methylvinylsiloxane) and 1,1-dimethyl-3,3,3-triphenyldisiloxane are calculated so that the vinyl side groups are substantially reacted. The contents are stirred under nitrogen and heated with an oil bath at 80-90° C.

for 16 hours. The contents are then vacuum stripped of xylene to produce a macromonomer having Formula IX; wherein $R^1$ is vinyl; $R^2$, $R^3$, $R^4$, $R^5$, $R^6$, and $R^7$ are methyl; and $R^9$ is phenyl.

EXAMPLE 5

Preparation of Polymer Film Comprising Polysiloxane of Example 4 and N-vinylpyrrolidone A mixture is made of the polysiloxane of Example 4, N-vinylpyrrolidone, and thermal polymerization initiator azobisisobutylonitrile (0.5 part by weight, from Monomer-Polymer Labs, Feasterville, Pa.). The relative amounts of the polysiloxane of Example 4 and N-vinylpyrrolidone are chosen to obtain the desired equilibrium water content. The mixture is cast between two silane-treated glass plates, separated with a Teflon™ gasket. After curing under heat at 80° C. for about 2 hours, the cured film is released and extracted with isopropanol overnight to give a hydrogel film of thickness about 200 μm.

The polymeric compositions of the present invention are transparent, flexible, of relatively high refractive index (such as in the ranges disclosed above) and of relatively high elongation. The polymeric compositions of the present invention with the desirable physical properties noted above are particularly useful in the manufacture of ophthalmic devices such as, but not limited to, relatively thin, foldable IOLs, contact lenses, corneal rings, corneal inlays, and keratoprostheses. Furthermore, absorbed water in the polymeric compositions of the present invention does not tend to form water vacuoles. Thus, the polymeric compositions of the present invention are more advantageously used in ophthalmic device applications than prior-art acrylic compositions.

IOLs having relatively thin optic portions are critical in enabling a surgeon to minimize surgical incision size. Keeping the surgical incision size to a minimum reduces intraoperative trauma and postoperative complications. A relatively thin IOL optic portion is also critical for accommodating certain anatomical locations in the eye such as the anterior chamber and the ciliary sulcus. IOLs may be placed in the anterior chamber for increasing visual acuity in either aphakic or phakic eyes, or placed in the ciliary sulcus for increasing visual acuity in phakic eyes.

The polymeric compositions of the present invention have the flexibility required to allow implants manufactured from the same to be folded or deformed for insertion into an eye through the smallest possible surgical incision, i.e., 3.5 mm or smaller.

In general, a method of making an ophthalmic device comprises: (a) providing a polymerizable composition comprising a siloxy-containing monomer or macromonomer of the present invention; and (b) curing the polymerizable composition under conditions and for a time sufficient to produce the ophthalmic device. The curing can be carried out such that the polymerizable composition is solidified into the final form of the ophthalmic device or such that a solid article is first produced and the ophthalmic device is further shaped therefrom. Preferably, the polymerizable composition further comprises a hydrophilic monomer or macromonomer.

In one embodiment, the method of making an ophthalmic device comprises: (a) providing a polymerizable composition comprising a siloxy-containing monomer or macromonomer; (b) disposing the polymerizable composition in a mold cavity, which forms a shape of the ophthalmic device; and (c) curing the polymerizable composition under a condition and for a time sufficient to form the ophthalmic device; wherein the siloxy-containing monomer or macromonomer has a formula of

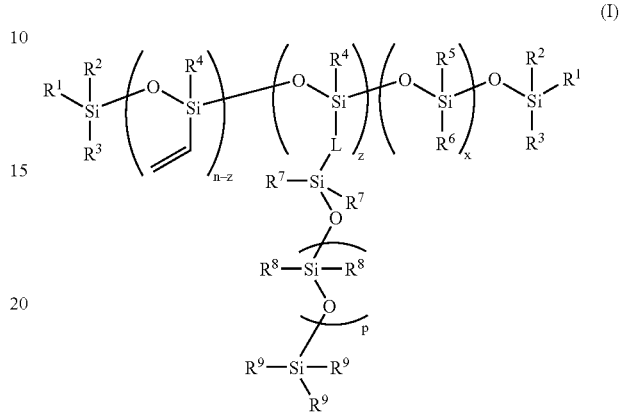

wherein $R^1$ is selected from the group consisting of unsubstituted and substituted linear $C_1$-$C_{10}$ alkyl groups, unsubstituted and substituted branched $C_3$-$C_{10}$ alkyl groups, unsubstituted and substituted cyclic $C_3$-$C_{10}$ alkyl groups, unsubstituted and substituted $C_6$-$C_{24}$ aryl groups, and vinyl group; $R^2$, $R^3$, $R^4$, $R^5$, $R^6$, $R^7$, $R^8$, and $R^9$ are independently selected from the group consisting of unsubstituted and substituted linear $C_1$-$C_{10}$ alkyl groups, unsubstituted and substituted branched $C_3$-$C_{10}$ alkyl groups, unsubstituted and substituted cyclic $C_3$-$C_{10}$ alkyl groups, and unsubstituted and substituted $C_6$-$C_{24}$ aryl groups; L is a divalent linking group; n, x, and z are positive integers; p is zero or a positive integer; and n−z≧0; provided that at least one of the $R^4$, $R^5$, $R^6$, $R^7$, $R^8$, and $R^9$ groups is selected from the group consisting of unsubstituted and substituted $C_6$-$C_{24}$ aryl groups. Preferably, the polymerizable composition further comprises a hydrophilic monomer or macromonomer.

In yet another embodiment, the polymerizable composition also comprises a crosslinking agent, or a polymerization initiator, or both. The polymerization initiator is preferably a thermal polymerization initiator. The curing can be carried out at an elevated temperature such as in the range from about ambient temperature to about 120° C. In some embodiments, the curing is carried out at a temperature in the range from slightly higher than ambient temperature to about 100° C. A time from about 1 minute to about 48 hours is typically adequate for the curing. In some instances, adequate curing time can be achieved in the range from about 10 minutes to about 10 hours. In still some other instances, adequate curing time is in the range from about 20 minutes to about 5 hours. In still some other instances, adequate curing time is in the range from about 20 minutes to about 2 hours.

In another embodiment, the method of making an ophthalmic device comprises: (a) providing polymerizable composition comprising a siloxy-containing monomer or a macromonomer; (b) casting the polymerizable composition under a condition and for a time sufficient to form a solid block; and (c) shaping the block into the ophthalmic device; wherein the siloxy-containing monomer has a formula of

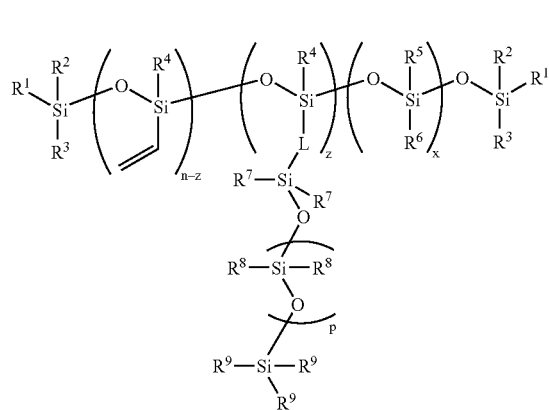

wherein $R^1$ is selected from the group consisting of unsubstituted and substituted linear $C_1$-$C_{10}$ alkyl groups, unsubstituted and substituted branched $C_3$-$C_{10}$ alkyl groups, unsubstituted and substituted cyclic $C_3$-$C_{10}$ alkyl groups, unsubstituted and substituted $C_6$-$C_{24}$ aryl groups, and vinyl group; $R^2$, $R^3$, $R^4$, $R^5$, $R^6$, $R^7$, $R^8$, and $R^9$ are independently selected from the group consisting of unsubstituted and substituted linear $C_1$-$C_{10}$ alkyl groups, unsubstituted and substituted branched $C_3$-$C_{10}$ alkyl groups, unsubstituted and substituted cyclic $C_3$-$C_{10}$ alkyl groups, and unsubstituted and substituted $C_6$-$C_{24}$ aryl groups; L is a divalent linking group; n, x, and z are positive integers; p is zero or a positive integer; and n−z≧0; provided that at least one of the $R^4$, $R^5$, $R^6$, $R^7$, $R^8$, and $R^9$ groups is selected from the group consisting of unsubstituted and substituted $C_6$-$C_{24}$ aryl groups. Preferably, the polymerizable composition further comprises a hydrophilic monomer or macromonomer.

In yet another embodiment, the polymerizable composition also comprises a crosslinking agent, or a polymerization initiator, or both. The polymerization initiator is preferably a thermal polymerization initiator. The casting can be carried out at an elevated temperature such as in the range from about 20° C. to about 120° C. In some embodiments, the casting is carried out at a temperature from slightly higher than ambient temperature to about 100° C. A time from about 1 minute to about 48 hours is typically adequate for the polymerization. The shaping can comprise cutting the solid block into wafers, and lathing or machining the wafers into the shape of the final ophthalmic device.

Ophthalmic medical devices manufactured using polymeric compositions of the present invention are used as customary in the field of ophthalmology. For example, in a surgical cataract procedure, an incision is placed in the cornea of an eye. Through the corneal incision the cataractous natural lens of the eye is removed (aphakic application) and an IOL is inserted into the anterior chamber, posterior chamber or lens capsule of the eye prior to closing the incision. However, the subject ophthalmic devices may likewise be used in accordance with other surgical procedures known to those skilled in the field of ophthalmology.

Polymeric materials produced from polymerization of siloxy-containing monomers, macromonomers, or polymers of the present invention, either alone or with one or more other monomers may be used to produce ophthalmic devices, such as contact lenses, corneal inlays, corneal rings, keratoprotheses, and the like.

While specific embodiments of the present invention have been described in the foregoing, it will be appreciated by those skilled in the art that many equivalents, modifications, substitutions, and variations may be made thereto without departing from the spirit and scope of the invention as defined in the appended claims.

What is claimed is:

1. An ophthalmic device comprising a polymeric composition that comprises units of a compound having a formula of

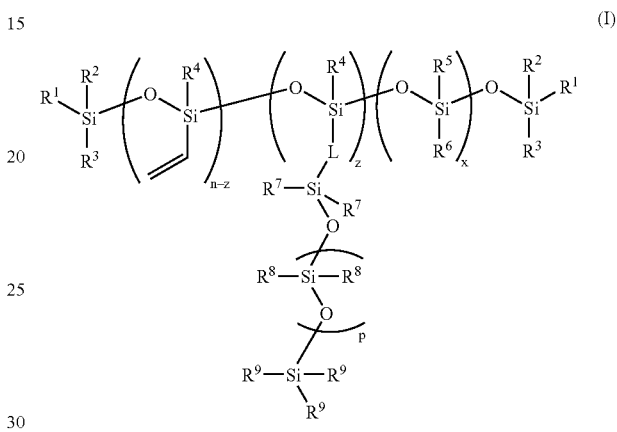

wherein $R^1$ is selected from the group consisting of unsubstituted and substituted linear $C_1$-$C_{10}$ alkyl groups, unsubstituted and substituted branched $C_3$-$C_{10}$ alkyl groups, unsubstituted and substituted cyclic $C_3$-$C_{10}$ alkyl groups, unsubstituted and substituted $C_6$-$C_{24}$ aryl groups, and vinyl group wherein at least one $R^1$ group is vinyl; $R^2$, $R^3$, $R^4$, $R^5$, $R^6$, $R^7$, $R^8$, and $R^9$ are independently selected from the group consisting of unsubstituted and substituted linear $C_1$-$C_{10}$ allkyl groups, unsubstituted and substituted branched $C_3$-$C_{10}$ alkyl groups, unsubstituted and substituted cyclic $C_3$-$C_{10}$ alkyl groups, and unsubstituted and substituted $C_6$-$C_{24}$ aryl groups; L is an ethanediyl group; n, x, and z are positive integers; p is zero or a positive integer; and n−z≧0; provided that at least one of $R^5$ and $R^6$ is an unsubstituted or substituted $C_6$-$C_{24}$ aryl.

2. The ophthalmic device of claim 1, wherein the $C_6$-$C_{24}$ aryl groups of $R^5$ and $R^6$ are selected from the group consisting of phenyl, biphenyl, cumenyl, mesityl, tolyl, xylyl, benzyl, vinylbenzyl, benzhydryl, cinnamyl, phenethyl, styryl, trityl, naphthyl, anthryl, phenanthryl, chrysyl, and derivatives thereof.

3. The ophthalmic device of claim 1, wherein $R^8$ and $R^9$ are phenyl groups.

4. The ophthalmic device of claim 1, wherein the polymeric composition further comprises units of a hydrophilic monomer selected from the group consisting of N-vinylpyrrolidone, 1,4-butanediol monovinyl ether, 2-aminoethyl vinyl ether, di(ethylene glycol)monovinyl ether, ethylene glycol butyl monovinyl ether, ethylene glycol monovinyl ether, glycidyl vinyl ether, vinyl carbonate, and vinyl carbamate.

5. The ophthalmic device of claim 1, wherein the ophthalmic device is an intraocular lens, a contact lens, a corneal inlay, a corneal ring, or a keratoprothesis.

* * * * *